(12) United States Patent
Bourdais

(10) Patent No.: US 12,467,626 B2
(45) Date of Patent: Nov. 11, 2025

(54) METHOD AND FURNACE FOR INCINERATING ORGANIC MATTER DERIVED FROM THE TREATMENT OF INDUSTRIAL OR AGRICULTURAL WASTE OR WASTEWATER, SUCH AS SLUDGE

(71) Applicant: SUEZ INTERNATIONAL, Paris (FR)

(72) Inventor: Jean-Louis Bourdais, Chateaubriant (FR)

(73) Assignee: SUEZ INTERNATIONAL, Paris (FR)

( * ) Notice: Subject to any disclaimer, the term of this patent is extended or adjusted under 35 U.S.C. 154(b) by 839 days.

(21) Appl. No.: 17/641,082

(22) PCT Filed: Sep. 11, 2020

(86) PCT No.: PCT/EP2020/075518
§ 371 (c)(1),
(2) Date: Mar. 7, 2022

(87) PCT Pub. No.: WO2021/048386
PCT Pub. Date: Mar. 18, 2021

(65) Prior Publication Data
US 2022/0349573 A1     Nov. 3, 2022

(30) Foreign Application Priority Data
Sep. 13, 2019 (FR) .................. FR1910166

(51) Int. Cl.
*F23G 5/30* (2006.01)
*F23G 7/00* (2006.01)
*F23G 7/10* (2006.01)

(52) U.S. Cl.
CPC ............. *F23G 5/30* (2013.01); *F23G 7/001* (2013.01); *F23G 7/10* (2013.01); *F23G 2203/50* (2013.01)

(58) Field of Classification Search
CPC .............................. F23G 5/30; F23G 2203/50
See application file for complete search history.

(56) References Cited

U.S. PATENT DOCUMENTS

| 4,363,292 A | 12/1982 | Engstroem |
| 2006/0104872 A1* | 5/2006 | Ishikawa .................. F23L 7/007 422/139 |
| 2019/0185357 A1 | 6/2019 | Delahaye |

FOREIGN PATENT DOCUMENTS

| FR | 2989597 A1 | 10/2013 |
| JP | S57127716 A | 8/1982 |

OTHER PUBLICATIONS

Kunii, D., et al., "Fluidization Engineering Second Edition," Butterworth-Heinemann, 1991, 521 pages.
(Continued)

*Primary Examiner* — David J Laux
(74) *Attorney, Agent, or Firm* — Harness, Dickey & Pierce, PLC

(57) ABSTRACT

A method for incinerating organic matter derived from the treatment of wastewater, or of industrial or agricultural waste, such as sludge and notably treatment plant sludge, is in a fluidized-bed incineration furnace, the furnace including a chamber in the lower part of which there is a bed of particles, preferentially sand, constituting a fluidization zone, in which fluidization zone the organic matter is introduced as fuel whilst air is injected as oxidizer into the bed of sand from a wind box through a fluidization dome surmounting the box. The air passes through passages made in the fluidization dome, and the furnace is configured to treat a nominal value of volume of organic matter to be treated. The method includes a step of adjusting the volume of the fluidization zone as a function of the volume of organic matter to be treated in which, when the volume of organic matter to be treated is lower than the nominal value, (Continued)

the volume of the fluidization zone is reduced from an initial volume to a reduced volume, and the incoming air flow is reduced by closing air passages so only the passages opening into the thus reduced fluidization zone are left active.

18 Claims, 1 Drawing Sheet

(56) References Cited

OTHER PUBLICATIONS

Leva, M., "Fluidization," Chapters 1-2, McGraw Hill Book Co., 1959, 46 pages.
Leva, M., "Fluidization," Chapters 3-5, McGraw Hill Book Co., 1959, 40 pages.
Leva, M., "Fluidization," Chapters 6-10, McGraw Hill Book Co., 1959, 58 pages.
Nicols, R., et al., "Experimental Studies of the Fluidization of Layered Sediments and the Formation of Fluid Escape Structures," Sedimentology, vol. 41, Issue, 2, Apr. 1994, pp. 233-253.

* cited by examiner

METHOD AND FURNACE FOR INCINERATING ORGANIC MATTER DERIVED FROM THE TREATMENT OF INDUSTRIAL OR AGRICULTURAL WASTE OR WASTEWATER, SUCH AS SLUDGE

This application claims priority to PCT patent application serial no. PCT/EP2020/075518 filed on Sep. 11, 2020, which claims priority to French patent application serial no. FR1910166 filed on Sep. 13, 2019, both of which are incorporated by reference herein.

BACKGROUND AND SUMMARY

The present invention relates to a furnace for incinerating organic matter from the treatment of industrial or agricultural waste or waste water, such as sludge, and in particular to a fluidised sand bed furnace, and to a method for incinerating organic matter such as sludge.

A fluidised bed incineration furnace comprises an enclosure in the lower part of which there is a bed of particles, preferably sand constituting the fluidisation zone into which sludge is injected as fuel. Below the fluidisation zone is a wind box which receives fluidisation air, preferably heated, through a radial inlet. The upper part of the wind box supports a fluidisation dome. This fluidisation dome is an essential part of the furnace as it is through this dome that the fluidisation air is distributed via passages, for example provided with blowing nozzles, arranged through the dome.

The fluidised bed furnace operates on the principle of suspending pre-calibrated particles, preferably sand particles, by means of a fluid which may or may not be pre-heated. The physics and thermodynamics of fluidised beds have been widely described in reference books such as "Fluidisation engineering", by Daizo Kunii and Octave Levenspiel, "Fluidisation", by Max Leva) or by Nichols. The fluidisation dome separates the fluid collector and the fluidised particles. It allows a good distribution of the fluid through blowing nozzles, or fluidisation tuyeres constituting passages towards the fluidisation zone.

The fluidised sand bed is heated to incineration temperature (750-850° C.) and constitutes an extremely turbulent medium in which heat exchanges reach very high transfer coefficients. Organic matter, typically dewatered sludge, generally fed into the base of this bed at one or more points, is very rapidly disintegrated by the turbulence of the sand, evaporation takes place instantaneously and partial combustion of the organic matter takes place with the fluidisation air as oxidant.

A dense fluidised bed with or without bed overflow is generally used with a stable expanded bed height (except for sand losses due to attrition). This is because the mineral matter in the sludge has a very small particle size compared to the sand grains in the bed, so that all the mineral ash is pneumatically driven into the upper zone of the furnace and then into the discharge pipes for fumes (fly ash).

The incineration method implemented in a furnace of this type thus makes it possible to destroy organic matter trapped in a mineral and/or liquid matrix, as is the case, for example, with sludge from a sewage treatment plant, or sludge from the treatment of industrial or agricultural waste or waste water. It is the most widely used method to carry out this destruction while respecting standards related to the regulations.

The sludge that is combusted in this type of furnace is generally pasty and still includes a lot of water at the outlet of conventional dewatering systems, the water content in the sludge generally being between 55% and 85% of the raw product. An oxidation-reduction reaction is implemented in the furnace by reacting the organic matter as fuel with an expanding fluid which is, in most cases, air as oxidant.

As the treated sludge generally still includes a lot of water—which cools down the bed and the furnace considerably—the organic matter of the sludge alone, which has a high calorific value, may not be sufficient to maintain the furnace at 850° C. which is its minimum operating temperature. Thus, depending on the quality of the sludge, the furnace may require injecting auxiliary fuel (natural gas, biogas or fuel oil or coal or any type of organic residue having a calorific value higher than 15,000 kJ/kg of organic matter) to maintain the temperature required by the regulations, which in France is 850° C. However, it is possible to avoid using this auxiliary fuel during incineration by virtue of the sole input heat of the organic matter of the sludge when the water content of this organic matter is low.

The applicant additionally provides an improved method for reducing consumption of auxiliary fuel by recovering energy from the fumes in order to obtain sludge that is better dewatered by partial evaporation of the water fraction and to achieve balance between water and organic matter that minimises the need for auxiliary fuel. However, to start the furnace, an auxiliary fuel such as generally gas or fuel oil is always used. This fuel injection is carried out in the bed, preferably in the first third of the bed, located in the lower part of the bed, and above the fluidisation grid, located above the dome, separating the fluid and the bed.

However, it is not currently possible to completely eliminate the need for auxiliary fuel consumption. One of the reasons for this drawback is that the amount of organic matter such as sludge to be treated by incineration is often much lower than a nominal value which was used to size the furnace.

Indeed, incineration plant construction projects have to meet specifications which generally require incineration of sludge with a given production at start of the operation and a production much higher than that at the start, in the future (10 or 20 years for example) to anticipate growth. Between these two situations, the sludge flow rate can be doubled while the incineration furnace has, at best, a flexibility of 1 to 1.6 for a selected range size.

Recurrently, the sludge flow rate in the start-up phase is much lower than the desired targeted volume for which the furnace was designed. Thus, to start an operation, one would need to use a furnace whose dimensions correspond to the start-up flow rate. Then, as the operation evolves towards the targeted sludge flow rate, it would be appropriate to replace this start-up furnace with a furnace whose dimensions are suitable to treat the targeted sludge flow rate. In view of the costs involved, this solution is excluded.

Thus, a furnace is generally designed to operate in the future and it can then operate in two modes, at start of the operation:
  either the sludge production of a given period, generally one week, is treated in a few days to be at the operating conditions of the furnace.
  or the sludge production is distributed to incinerate it continuously, for example over the week, which means operating at a lower hourly rate, generally lower than the minimum flow rate accepted by the furnace in order to have the best yield and/or remain self-heating.

In both cases, an auxiliary fuel is used as a supplement.
  either to keep the furnace hot during the non-incineration phases (the so-called maintenance phase). The furnace is kept hot at around 800° C.+/−50° C. in the sand bed, which also makes it possible to keep equipment downstream of the furnace hot and to limit amplitude of thermal cycles that can damage the equipment.

or during incineration to make up for the lack of energy due to the decrease in the flow rate of sludge, and consequently of the organic matter, which is an intrinsic source of energy, but also due to the greater heat loss in the fumes. Indeed, the present air flow rate is then much higher than the stoichiometric proportions of the sludge combustion.

This stoichiometric ratio corresponds to the airflow rate strictly necessary to ensure total combustion (or oxidation) of the fuel. Any excess air actually generates energy losses, since it is an additional mass to be heated.

One solution could be to reduce the amount of air to match the amount of sludge and to approach a stoichiometric ratio close to 1. However, there is a low limit to the amount of air which allows the fluidisation of the particles, especially sand. This air is injected at the base of the sand bed in the furnace. Below this minimum flow rate, the sand is poorly fluidised and is no longer operational to break up the sludge into small pieces, which is injected in the form of a cylinder with a diameter of between 50 mm and 250 mm, especially around 100 mm. In a given dimension of the furnace, the variation in air flow rate between a maximum value and a minimum value is 60%, which corresponds to a variation in sludge flow rate of 60% to within a few % by varying the excess air, in other words the sludge flow rate can vary from 1 to 1.6. This range of furnace design, with a maximum operating dimension corresponding to the operating capacity of the furnace at nominal sludge production, noted X, allows operation with reduced capacities to 60%, that is with a sludge flow rate up to 60% lower than the nominal capacity of the furnace, while maintaining an air-sludge ratio favourable to good combustion and fluidisation.

If the flow rate is too low, combustion of the volatile matter in the sand bed cannot be ensured either. The temperature of the sand decreases and is no longer homogeneous, which can create dead zones with a risk of agglomeration of the sand, leading to the complete fluidisation of the bed being stopped.

It could also be contemplated to reduce the particle size—for example by changing matrix of the fluidised bed—and thus allow the air flow rate necessary for fluidisation to be decreased. Such a solution exists but is difficult to implement and may not be sufficient: the capacity range could potentially be increased from 1-1.6 to 1-2.0 within one furnace dimension. Major limits of such solutions appear when the extreme production rates (start-up and future) cannot be extended over a single furnace dimension.

In order to overcome these drawbacks, the invention therefore suggests being able to modify the fluidisation air flow rate in accordance with the volume of sludge to be treated without affecting the fluidisation quality of the sand bed, and this temporarily if necessary. In other words, the invention consists in providing a furnace whose dimensions are defined at the fluidisation dome, for example 2.93 m, according to a future production target (generally operation in the low rate of its dimensions), dimensions which can be modified momentarily, to furnace dimensions of a smaller size, for example a diameter reduced to 2.34 m for start-up of this furnace. Thus, a range of maximum capacity of a furnace having given dimensions from 1 to 1.6 is extended to a range of 1 to 3 for the sludge flow rate for furnaces having small dimensions and 1 to 2 for furnaces having large dimensions, by combining the minimum operating rate of a furnace with its reduced volume and air flow rate and its maximum rate with its initial volume and flow rate.

To this end, one object of the invention is a method for incinerating organic matter, consisting of organic matter trapped in a mineral and/or liquid matrix, especially from the treatment of waste water, industrial or agricultural waste, such as sludge and especially sewage plant sludge, in a fluidised bed furnace, said furnace comprising an enclosure in the lower part of which there is a bed of particles, preferably sand, constituting a fluidisation zone Zf, fluidisation zone Zf into which organic matter is introduced as fuel while air is injected as oxidant into the sand bed from a wind box through a fluidisation dome on top of said box, the air passing through passages arranged in the fluidisation dome, the furnace being configured to treat a nominal value Vn of volume Vmo of organic matter to be treated, said method comprising a step of adjusting the volume of the fluidisation zone Zf and advantageously the flow rate of air coming into said fluidisation zone Zf, as a function of the volume Vmo of organic matter to be treated, in which, when the volume Vmo of organic matter to be treated is lower than the nominal value Vn, the volume of the fluidisation zone is reduced from an initial volume Vfi to a reduced volume Vfr, and the air flow rate is reduced by sealing air passages to leave active only the passages opening into the thus reduced fluidisation zone Zfr.

Advantageously, the method according to the invention makes it possible, by reducing the volume of the fluidisation zone Zf, and by limiting the passages of the fluidisation dome to those active in this reduced fluidisation zone Zfr, to define a volume of reduced fluidisation zone Vfr which allows the most optimal incineration treatment possible with respect to the volume Vmo of organic matter to be treated, adapted to the start-up conditions with a small organic matter flow rate. Thus, when the volume of sludge to be treated is lower than the nominal value of the volume of sludge to be treated and the low limit of fluidisation is reached with a furnace having dimension X, the volume is reduced, which would correspond to a furnace having dimension X−1 or to an intermediate size of the fluidisation zone, and air passages are sealed so as to leave active only the passages opening into this reduced fluidisation zone.

Moreover, advantageously, this adjustment of the volume of the fluidisation zone is a preferably temporary volume reduction. Thus, the method then includes a complementary volume adjustment step in which as soon as the volume Vmo of organic matter to be treated approaches or reaches the nominal value Vn, the initial volume Vfi of the fluidisation zone suitable for treating the nominal volume Vn of organic matter to be treated is restored, and advantageously also the initial flow rate of air coming into said zone by freeing the air passages of the fluidisation dome which were sealed. In this way, the incineration method can be implemented while limiting consumption of fuel and consequently of auxiliary fuel.

This method can advantageously be applied to existing and operational furnaces as well as to future projects (furnaces under construction or to be constructed). Thus, an insert is installed in the form of a sleeve with a shape complementary to the portion of the furnace enclosure delimiting the fluidisation zone Zf and extending against said portion of the enclosure from the fluidisation dome over a height lower than or equal to the height of the fluidisation zone. Thus, at least the volume of the fluidisation zone is reduced by placing means for reducing the volume of the fluidisation zone Zf, consisting of this insert in the form of a sleeve with a shape and height complementary to the portion of the furnace enclosure delimiting the fluidisation zone Zf, extending against said portion of the enclosure from the fluidisation dome, and delimiting an internal volume corresponding to the reduced volume of the fluidisation zone.

According to one alternative of the method, the volume of the furnace enclosure above the fluidisation zone can also be reduced by installing an insert over the entire height of the furnace. Advantageously, the reduction in the volume of the enclosure above the fluidisation zone can make it possible to improve ash discharge and to limit heat losses. With this alternative, the energy and economic gain is further improved.

For the purposes of the present invention, the sleeve is a cylindrical element whose shape corresponds to a cylindrical shape of the fluidisation zone. However, the fluidisation zone of a furnace usually has a frustoconical shape and the sleeve is also frustoconical. According to this embodiment, the wall of the sleeve has a thickness which may be constant or variable, especially progressive, which defines an internal diameter of said sleeve, this internal diameter corresponding to the reduced diameter of the new reduced fluidisation zone Zfr delimited by this sleeve.

The sleeve is advantageously installed along the wall of the fluidisation zone in the furnace and extends from the fluidisation dome, masking the air passages arranged through the fluidisation dome, at the periphery thereof, and ending up under the thickness of said sleeve, which reduces the air intake to the reduced fluidisation zone. This sleeve also constitutes sealing means.

Thus, advantageously, the reduced fluidisation air volume flow rate can be expressed according to the following formula, corresponding to the same formula for the nominal case, and which takes into account the flow rate of organic matter to be treated:

$\Phi v' = \Phi b' \times S \times MV \times Coef1 \times Coef2$, where $\Phi v'$: fluidisation air flow rate in kg/h $\Phi b'$: raw sludge flow rate in kg/h, (raw sludge being water and dry matter, dry matter being mineral matter and organic matter).

S: fraction of dry matter in raw sludge in %.

MV: fraction of organic matter in the dry fraction in %.

Coef1: stoichiometric ratio corresponding to the amount of air in kg/h to combust 1 kg of organic matter, ranging from 5 to 10 depending on the type of organic matter Coef2: excess air desired to ensure complete combustion of the organic matter between 1.01 and 1.4.

By raw sludge, also called wet sludge, it is meant the incoming mixture of dry matter and water. The dryness of this raw sludge is preferably between 18 and 35%, generally in the range of 22-26%.

According to an even more preferred embodiment, the enclosure at the fluidisation zone has a frustoconical shape between 0° and 45° with respect to the vertical, the insert or sleeve preferably having a frustoconical shape:

its external diameter Dext equal to the diameter of the cone frustum of the enclosure over the height of the added cone:

Dext=D1 which can vary over the height H, with

D1: internal diameter of the fluidisation zone of the enclosure designed for future production;

H: height of the zone where the fluidisation of the particles dynamically develops its internal diameter Dint equal to the external diameter of the added cone frustum minus two times a thickness A of the sleeve Dint=Dext−A×2, with A: thickness of the insert added at the periphery of the fluidisation zone to reduce the diameter of the fluidisation zone, which may be constant or variable, and in particular progressive, and advantageously between 0.15 and 0.7 m, preferably between 0.25 m and 0.35 m, the height of the cone frustum H being chosen such that: H=B+C, with B corresponding to the height of the particle bed at rest, B being between 0.3 m and 1.5 m, preferably equal to about 1 m, and C corresponds to the dynamics, that is the desired turbulence in the sand bed between 0 and 2 m, preferably between 0.3 and 0.5 m. This turbulence or dynamics corresponds to the projection height of the particles.

The reduction in the air flow rate is advantageously achieved by sealing the air passages located at the periphery of the fluidisation dome, and which end up under the volume reduction means which advantageously serve as means for sealing the air passages. Thus, in order to maintain fluidisation of the particles, the volume of the fluidisation zone Vfr is preferably reduced by an annular volume of abrasion and temperature resistant materials added at the periphery of the fluidisation zone. This annular volume, such as a wall inserted against the wall of the enclosure, constitutes the insert or sleeve.

It is also possible to contemplate an insert installed in the fluidisation zone above the fluidisation dome, but not along the wall of said zone, to reduce the volume of this fluidisation zone and the air flow rate by sealing part of the air passages. An example of an abrasion and high temperature resistant material is refractory concrete, or refractory bricks.

The fluidisation air volume flow rate of the reduced volume fluidisation zone $\Phi v'$ is therefore reduced in proportion to the initial air flow rate $\Phi v$ and the thickness of the cylindrical element according to the following formula:

$$\Phi v' = \Phi v \times ((D1-2A)/D1)^2 \text{ where}$$

D1: internal diameter at the base of the fluidisation zone of the enclosure designed for future production, in m A: thickness of the element added at the periphery of the fluidisation zone to reduce the diameter of the fluidisation zone, typically between 0.2 m and 0.7 m, preferably between 0.25 m and 0.35 m.

One object of the present invention is also a furnace for incinerating organic matter, consisting of organic matter trapped in a mineral and/or liquid matrix, especially from the treatment of waste water, industrial or agricultural waste, such as sludge and especially sewage plant sludge, and having an enclosure in the lower part of which there is a fluidised bed of particles, preferably sand, the furnace further comprising at least from bottom to top:

a wind box, the upper part of which supports a fluidisation dome, having passages through which the air coming from the wind box is distributed into a fluidisation zone Zf which corresponds to the particle bed, at least one organic matter feed and at least means of injecting supplemental fuel being provided to feed the fluidisation zone, above the fluidisation zone Zf there is an expansion and post-combustion zone, on top of which lies an upper vault of the enclosure at which there is a discharge pipe for the combustion products, the furnace being configured for the treatment of a nominal value Vn of volume Vmo of organic matter to be treated, and said furnace being characterised in that it includes means for reducing the volume of the fluidisation zone from an initial volume Vfi to a reduced volume Vfr, and means for sealing the air passages configured to reduce the incoming air flow rate by leaving active only the passages opening into the reduced fluidisation zone Zfr, when the volume Vmo of organic matter to be treated is lower than the nominal value Vn of organic matter volume.

Thus, when the volume Vmo of organic matter to be treated is lower than the nominal value Vn (typically from 30% to 80% of Vn), the furnace can operate optimally because the volume of the fluidisation zone is reduced from an initial volume Vfi to a reduced volume Vfr and the injected air flow rate is reduced by a part of the air passages being sealed so as to leave active only passages opening into the thus reduced fluidisation zone. The furnace according to the invention allows the implementation of the incineration method described above.

Very advantageously, the reduction means and the sealing means can further be dismantled, so that when the volume Vmo of organic matter to be treated is close or equal to the nominal value Vn, they can be removed and the initial volume Vfi and the number of air passages in the fluidisation zone can be restored. Thus, it is possible to reduce the volume of the fluidisation zone and the volume of air blown in to optimally treat a volume Vmo of organic matter lower than that of the nominal value Vn while maintaining the dimensions of a furnace for future use.

Advantageously, the means for reducing the volume of the fluidisation zone and the means for sealing the air passages are one and the same. According to a preferred embodiment, said reduction and sealing means consist of an insert installed in the fluidisation zone of the furnace in the form of a sleeve of complementary shape to the portion of the enclosure delimiting the fluidisation zone and extending against said portion of the enclosure from the fluidisation dome, forming an additional wall doubling the wall of the fluidisation zone and sealing the air passages provided in the dome at the periphery thereof.

This sleeve may therefore be cylindrical when the enclosure zone is cylindrical. Preferably, as the fluidisation zone has a frustoconical shape, the reduction and sealing means consist of a frustoconical, abrasion and temperature resistant sleeve. It fits into the existing cone frustrum zone up to the base of the fluidisation grid. Thus the cross-sectional area at the grid is reduced and at the same velocity, the fluidisation air flow rate is advantageously reduced.

The thickness of the insert, such as a cylindrical or frustoconical sleeve, is proportional to the reduction in the air flow rate desired to combust the sludge or other waste. Preferably, its thickness corresponds to the thickness of a ring of fluidisation nozzles at the periphery of the fluidisation dome. Indeed, a dome can consist of a succession of concentric rings respectively carrying air passages such as fluidisation nozzles, blowing ejectors. The thickness of the insert is therefore chosen to define the volume of the reduced fluidisation zone Vfr and a reduced cross-sectional area of the fluidisation dome.

The thickness of the sleeve, which may be constant or variable, preferably progressive, is thus advantageously chosen to define the volume of the reduced fluidisation zone Zfr and a reduced cross-sectional area of the fluidisation dome, the thickness of this sleeve being proportional to the reduction in the air flow rate desired to combust the sludge or other waste. Thus, the volume of the fluidisation zone Vfr is preferably reduced by an annular volume of abrasion and temperature resistant materials added at the periphery of the fluidisation zone, this annular volume such as a wall inserted against the wall of the enclosure constitutes the insert or sleeve.

According to an embodiment of the furnace according to the invention, volume reduction means extend beyond the fluidisation zone over the entire height of the furnace. This also limits the volume of the furnace enclosure. This reduction in the volume of the enclosure above the fluidisation zone may make it possible to improve energy and economic gain, especially by improving ash discharge and limiting heat losses.

According to an embodiment, the reduction and sealing means are inserted to an existing furnace whose operation is to be optimised with respect to a nominal amount of organic matter to be treated which has not yet been reached. Alternatively, the reduction and sealing means are provided upon constructing the furnace, so as to enable operation to be started.

Advantageously, the reduction and sealing means extend along the walls of the fluidisation zone and by their thickness reduce the diameter of said zone while sealing the passages arranged in the fluidisation dome and above which they rest. These reduction and sealing means can be placed on existing furnaces but can also be deployed on furnaces under construction in order to optimise fuel consumption from the start.

They are easily added by constructing elementary parts (additional wall added in the fluidisation zone Zf) after the final construction or during the initial construction. They can therefore be dismantled just as easily, to restore the furnace to its full volume required for the nominal flow rate of organic matter, especially sludge, for which it was designed.

The materials used to make this wall may be of a similar quality to the refractory internal wall of the furnace. They are, for example, refractory bricks typically including at least 20% alumina (preferably 42-45% alumina) to withstand the abrasion exerted by the moving sand. They are typically joined with jointing cement.

Alternatively, refractory concrete, especially concrete comprising between 30 and 35% alumina by weight based on the total weight of the concrete, may be used to make this additional wall. In this case, concrete can be sprayed or moulded against the internal wall of the fluidisation zone. Such materials allow the reduction means to be used for approximately 1 to 2 years under the operating conditions of the furnace, but are generally less resistant than the material constituting the furnace itself, which facilitates the destruction of these reduction means when the initial volume Vfi is to be restored. Preferably the materials used for the sealing and reduction means, which are less resistant than the materials constituting the furnace itself, can therefore be refractory concretes with an alumina content of between 30 and 35% by weight based on the total weight of the concrete, whereas the concretes used to make the furnace itself preferably have an alumina content of 40 to 42%. The insert forming wall can thus be made of cheaper materials.

A furnace according to the invention is advantageously made with the same materials and shaping tools used to construct the interior of a furnace. These materials are generally refractory bricks and/or refractory concrete or a combination of both. The reduction and sealing means may be prefabricated in a factory prior to installation in a furnace or they may be made in situ, that is in the furnace, by assembling bricks, spraying or casting concrete into the furnace to form an additional wall constituting the sleeve. As the sleeve consists of an additional wall inserted to the wall of the fluidisation zone and which may be made of refractory bricks or concrete, the techniques for laying and removing refractory materials to make and remove this additional, temporary wall are the same as those used to carry out maintenance work or dismantle refractory walls, namely by loosening the bricks or cutting them up for discharge in small, easily transportable pieces.

BRIEF DESCRIPTION OF THE DRAWINGS

The invention will now be described in more detail with reference to the figures where.

DETAILED DESCRIPTION

Figure 1:
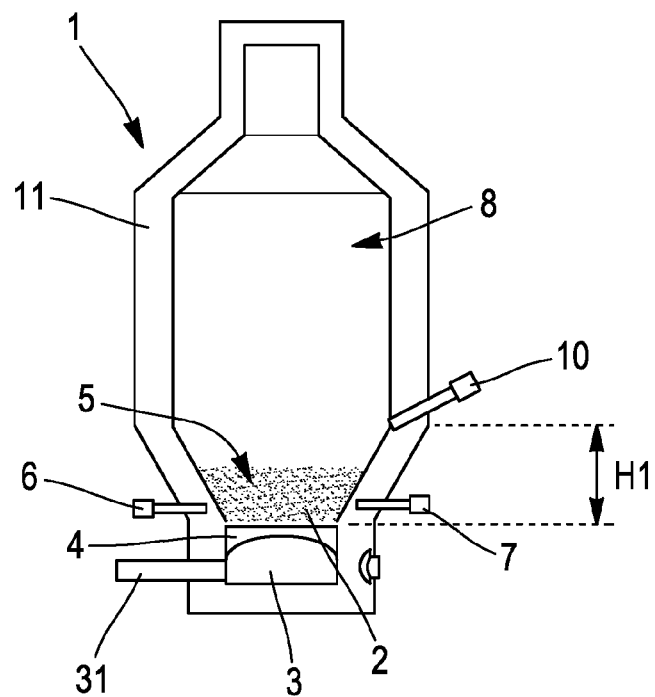
FIG. 1 is a longitudinal cross-section view of a incineration furnace according to the invention in nominal operating mode.

As can be seen in FIG. 1, a furnace 1 for incinerating organic matter from the treatment of industrial, agricultural wastes or waste water, such as sludge, has an enclosure 11, typically made of refractory concrete, in the lower part of which is a fluidised particle bed, preferably a sand bed 2. The furnace further comprises a wind box 3 which receives fluidisation air, which preferably has been heated, through a radial inlet 31. The upper part of the wind box 3 supports a fluidisation dome 4 which constitutes an essential part of the furnace 1. Actually, it is through this dome 4 that the fluidisation air coming from the wind box 3 is distributed, by means of passages arranged in the dome 4, and through which the air coming from the wind box 3 is distributed into the part of the enclosure known as the fluidisation zone Zf 5 which corresponds to the location of the sand bed 2.

In this fluidisation zone Zf 5 there is at least one sludge feed 6 and at least one supplemental fuel injection 7. In some furnaces, this sludge feed is carried out above the fluidisation zone. A feed 10 is also provided for introducing sand into the furnace. Above the fluidisation zone 5 there is the expansion and post-combustion zone 8, on top of which lies the upper vault of the enclosure 11, at which there is a discharge pipe for the combustion products (not represented).

This furnace 1 is configured for the treatment of a nominal value Vn of volume Vmo of sludge to be treated. At the fluidisation zone Zf 5, the wall of the furnace 1 has the shape of a cone frustrum, the largest upper base of which is on the side of the enclosure 11 and the smallest lower base of which is on the side of the fluidisation dome 4. The fluidisation zone 5 thus delimits a volume in which the sand bed 2 is located above the fluidisation dome 4, arranged with blowing ejectors 51.

As a result, under the effect of the heated air coming from the wind box 3 and passing through the fluidisation dome 4, a displacement of the sand bed 2 is achieved which can only go towards the top of the furnace 1. The ascensional velocity is related to the injected air flow rate and the lower section of the cone frustrum. The ascensional velocity determined for the nominal treatment value is typically between 0.75 m/s for good fluidisation of the sand and 1.2 m/s to avoid too much sand flying away, preferably a velocity of 0.9 m/s.

The furnace 1 is therefore dimensioned for a sludge treatment nominal value Vn. However, the volume of sludge in the production start-up phase of this type of furnace 1 is recurrently much lower than the desired targeted nominal volume for which the construction of furnace 1 was designed.

In order to operate the furnace 1 optimally even during the production start-up phase, that is when the volume Vmo of sludge to be treated is lower than the nominal value Vn of the volume of sludge to be treated, the volume of the fluidisation zone zf 5 is reduced from an initial volume Vfi to a reduced volume Vfr, and the air passages are sealed so as to leave active only the passages opening into the reduced fluidisation zone 5'. In order to implement this, means for reducing the volume of said zone 5 and means for sealing the air passages, configured so as to leave active only the passages opening into the reduced fluidisation zone Zfr 5', are placed in the fluidisation zone Zf 5.

Figure 2:
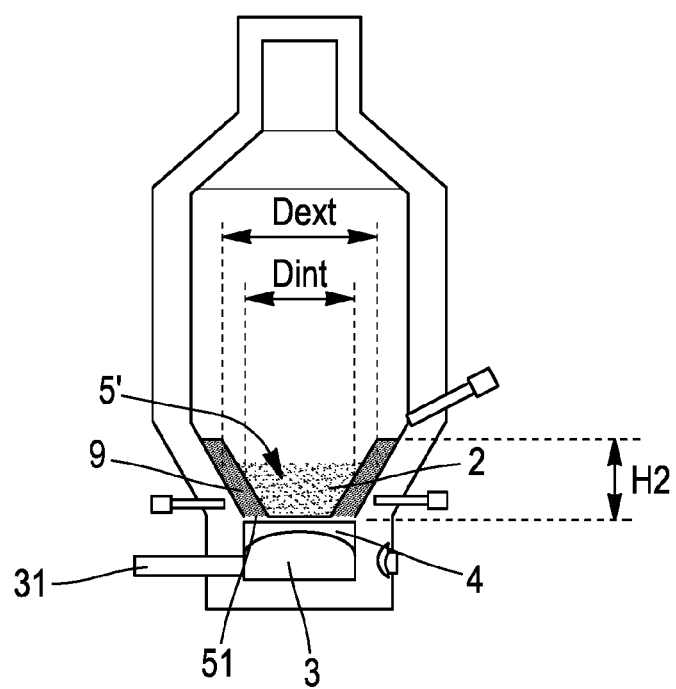
FIG. 2 is a longitudinal cross-sectional view of the furnace of FIG. 1 in start-up operating mode.

As can be seen in FIG. 2, the portion of enclosure 11 delimiting the fluidisation zone Zf 5 has an insert supported by it in the form of a frustoconical sleeve 9. This sleeve extends from the fluidisation dome 4 to a height H2 lower than or equal to the height H1 of the frustoconical portion of the enclosure 11. This sleeve 9 has an external diameter Dext which varies as a function of the height H2 of the insert 9, corresponding to the internal diameter D1 of the fluidisation zone 5, and a smaller internal diameter Dint corresponding to the diameter Dext minus twice the value of the thickness A of the insert 9. As a result, the volume of the thus created fluidisation zone Zfr 5' is reduced.

As this volume Vfr is reduced, the volume of sand is also reduced. The air volume flow rate is limited by the air passages being sealed by the insert 9 which rests partly on the fluidisation dome 4. The frustoconical effect also allows a load recovery of the frustoconical element by the frustoconical part of the enclosure. The section at the fluidisation dome 4 is reduced and at the same air velocity the fluidisation air flow rate is reduced. The thickness A of the frustoconical insert 9 is proportional to the reduction in the air flow rate desired to combust the organic matter to be treated (sludge and/or other waste).

The fluidisation air volume flow rate in the fluidisation zone 5' of reduced volume Vfr is therefore reduced in proportion to the initial flow rate according to the following formula:

$$\Phi v' = \Phi v \times ((D1-2A)/D1)^2 \text{ where}$$

D1: average internal diameter at the base of the fluidisation zone of the enclosure designed for future production A: thickness of the element added at the periphery of the fluidisation zone to reduce the diameter of the fluidisation zone and between 0.2 and 0.7 and preferably between 0.25 m and 0.350 m.

To determine what air flow rate is required with a volume of sludge to be treated lower than the nominal value, the formula is:

$$\Phi v' = \Phi b' \times S \times MV \times \text{Coef1} \times \text{Coef2, where}$$

$\Phi v'$: fluidisation air flow rate in kg/h
$\Phi b'$: raw sludge flow in kg/h
S: fraction of dry matter in sludge (raw) in %
MV: fraction of organic matter in the dry fraction in %
Coef1: stoichiometric ratio corresponding to the amount of air in kg/h to combust 1 kg of organic matter, ranging from 5 to 10 depending on the type of organic matter
Coef2: excess air desired to ensure complete combustion of the organic matter between 1.01 and 1.4.

Thus, according to an exemplary embodiment of the method, a furnace is made whose fluidisation zone diameter is 2.83 m (size X) and which is constructed to treat at least 963 kgMS/h. Such a furnace is operated with a preheated fluidisation air flow rate, for example at 550° C., between 6700 Nm³/h (minimum blown air velocity for fluidisation ~0.75 m/s) corresponding to a sludge dry matter flow rate, for example 963 kgMS/h and 10,750 Nm³/h (maximum fluidisation velocity ~1.2 m/s) corresponding to a flow rate of 1550 kgMS/h. The oxygen content in both cases is identical.

The furnace start-up is characterised by a flow rate well below the minimum rate of 600 kgMS/h for which a fluidisation air flow rate of 4250 Nm³/h would be sufficient and therefore a smaller furnace (size X-1) would be required. If this flow rate is distributed 7 days a week and applied to the original size (X) furnace, then the fluidisation velocity for this type of already constructed furnace would be 0.47 m/s and is therefore too low in terms of turbulence in the bed.

Two solutions are possible. In the first case, the sludge is treated over 3 to 4 days per week at the minimum flow rate of the furnace for which it was constructed (963 kgMS/h) with a consumption of 19 kg/h of gas required during the sludge incineration. On the other hand, the furnace will then be maintained at temperature for the rest of the week, which corresponds to a significant consumption in the order of 40 kg/h of natural gas.

In a second case, the sludge is treated 7 days a week with an air flow rate of 6,700 Nm3/h in order to respect the minimum fluidisation air velocity of 0.75 m/s to obtain the necessary turbulence in the sand bed. The excess air generates losses and strongly increases the consumption of auxiliary fuel, increasing from a consumption of 19 kg/h (as in the previous case over the 3 to 4 days of incineration) to 46 kg/h of natural gas over the 7 days, to compensate for the losses. This solution is chosen by the operator to preserve the equipment downstream of the furnace.

The method of the invention is then implemented, and the dimension of the fluidisation zone is reduced to a diameter of 2.23 m by adding a 300 mm thick insert over a height of 1.3 m, for example. The amount of air is then adapted to the amount of sludge while maintaining good turbulence in the furnace. The flow rate can be reduced to 4200 Nm³/h to meet the minimum turbulence velocity of 0.75 m/s in this new reduced fluidisation zone. The excess air is reduced, and advantageously the natural gas consumption from 46 kg/h to 18 kg/h.

The method of the invention not only allows operating savings in the order of 100,000 €/year but also advantageously limits $CO_2$ emissions (616 t $CO_2$/year are no longer released into the atmosphere). In certain waste treatment plants already in place, the implementation of an incineration furnace according to the invention allows a gain of natural gas used as fuel of 50 to 200 k€uros per year for an estimated investment of 30 to 70 k€uros. The invention thus provides an interesting economic advantage while being simple to implement in both existing and new installations.

The invention claimed is:

1. A method for incinerating organic matter trapped in a mineral and/or liquid matrix issued from the treatment of waste water, industrial or agricultural waste, in a fluidised bed incineration furnace configured to treat a volume of the organic matter equal to a nominal value, the furnace including an enclosure in a lower part thereof, the enclosure including a particle bed constituting a fluidisation zone, the method comprising:
   introducing the organic matter as fuel into the fluidisation zone while injecting air as an oxidant into the particle bed from a wind box through a fluidisation dome on top of the wind box, the air passing through passages provided in the fluidisation dome; and
   adjusting a volume of the fluidisation zone and a flow rate of the air coming into the fluidisation zone as a function of a volume of the organic matter to be treated, in which, when the volume of the organic matter to be treated is lower than the nominal value, reducing the volume of the fluidisation zone from an initial volume to a reduced volume, and reducing the flow rate of the air by sealing a portion of the passages so as to leave active only the passages opening into the thus reduced volume fluidisation zone,
   wherein adjusting the volume of the fluidisation zone comprises installing an insert in the form of a sleeve having a shape complementary to the portion of the enclosure delimiting the fluidisation zone and extending against the portion of the enclosure delimiting the fluidisation zone from the fluidisation dome over a height lower than or equal to a height of the fluidisation zone.

2. The method according to claim 1, wherein the adjustment of the volume of the fluidisation zone is a temporary volume reduction.

3. The method according to claim 2, further comprising:
   a complementary volume adjustment step in which, as soon as the volume of the organic matter to be treated approaches or reaches the nominal value, restoring the volume of the fluidization zone to the initial volume and restoring the flow rate of the air to an initial flow rate by freeing the portion of the passages that were sealed.

4. The method according to claim 1, wherein the enclosure at the fluidisation zone has a frustoconical shape with a side extending at an angle of between 0° and 45° with respect to a vertical, the sleeve having a frustoconical shape with:
   (a) an external diameter Dext at a given height above the fluidisation dome equal to a diameter of the frustoconical shape of the enclosure at the given height, and
   (b) an internal diameter Dint at a given height above the fluidisation dome equal to an external diameter of the added cone frustum frustoconical shape of the enclosure at the given height minus two times a thickness A of the sleeve.

5. The method according to claim 4, wherein a height of the sleeve is equal to the sum of a height of the particle bed at rest and a projection height of particles in the particle bed when fluidised, and wherein the height of the particle bed is between 0.3 m and 1.5 m and the projection height of particles is between 0 and 2 m.

6. The method according to claim 1, further comprising:
   installing the sleeve in the furnace such that the sleeve masks a portion of the passages in the fluidisation dome at a periphery thereof under a thickness of the sleeve.

7. The method according to claim 1, further comprising:
   dismantling the insert such that the volume of the fluidisation zone is restored to the initial volume; and
   treating in the furnace a volume of the organic matter equal to the nominal value,
   wherein the initial volume of the fluidisation zone is the volume of the fluidisation zone suitable for treating a volume of the organic matter equal to the nominal value.

8. A method for incinerating organic matter trapped in a mineral and/or liquid matrix issued from the treatment of waste water, industrial or agricultural waste, in a fluidised bed incineration furnace configured to treat a volume of the organic matter equal to a nominal value, the furnace including an enclosure in a lower part thereof, the enclosure including a particle bed constituting a fluidisation zone, the method comprising:
- introducing the organic matter as fuel into the fluidisation zone while injecting air as an oxidant into the particle bed from a wind box through a fluidisation dome on top of the wind box, the air passing through passages provided in the fluidisation dome;
- adjusting a volume of the fluidisation zone and a flow rate of the air coming into the fluidisation zone as a function of a volume of the organic matter to be treated, in which, when the volume of the organic matter to be treated is lower than the nominal value, reducing the volume of the fluidisation zone from an initial volume to a reduced volume, and reducing the flow rate of the air by sealing a portion of the passages so as to leave active only the passages opening into the thus reduced volume fluidisation zone; and
- reducing the volume of the enclosure of the furnace above the fluidisation zone by installing an insert extending over an entire height of the furnace.

9. A furnace for incinerating organic matter from treatment of waste water, industrial or agricultural waste, the furnace being configured to treat a volume of the organic matter equal to a nominal value and comprising an enclosure in a lower part thereof in which there is a fluidised particle bed, the furnace further comprising, at least from bottom to top:
- a wind box having an upper part which supports a fluidisation dome having passages through which air coming from the wind box is distributed into a fluidisation zone corresponding to the fluidised particle bed;
- at least one organic matter feed and at least a supplemental fuel injector configured to feed supplemental fuel to the fluidisation zone;
- an expansion and post-combustion zone above the fluidisation zone;
- an upper vault on top of the expansion and post-combustion zone, the upper vault including a discharge pipe for combustion products; and
- when a volume of the organic matter to be treated is lower than the nominal value, an insert in the form of a sleeve having a shape complementary to a portion of the enclosure delimiting the fluidisation zone and extending from the fluidisation dome against the portion of the enclosure delimiting the fluidisation zone such that a volume of the fluidisation zone is reduced from an initial volume to a reduced volume and a portion of the passages in the fluidisation dome are sealed leaving active only the passages opening into the reduced volume fluidisation zone and a flow rate of the air through the passages is reduced.

10. The furnace according to claim 9, wherein a thickness A of the insert is chosen to define the volume of the reduced volume fluidisation zone and a reduced cross-sectional area of the fluidisation dome, the thickness A of the insert being proportional to the reduction in the flow rate of the air through the passages.

11. The furnace according to claim 10, wherein a desired flow rate of the air through the passages is defined according to the following formulas (1) and (2):
(1) $\Phi v' = \Phi b' \times S \times MV \times Coef1 \times Coef2$, where:
  $\Phi v'$: a fluidisation air flow rate in kg/h,
  $\Phi b'$: an organic matter flow rate in kg/h,
  S: a fraction of dry matter in the organic matter in %,
  MV: a fraction of the organic matter in the dry fraction in %,
  Coef1: a stoichiometric ratio corresponding to an amount of the air in kg/h to combust 1 kg of the organic matter, ranging from 5 to 10 depending on the type of the organic matter,
  Coef2: excess air desired to ensure complete combustion of the organic matter between 1.01 and 1.4,
(2) $\Phi v' = \Phi v \times ((D1-2A)/D1)^2$, where:
  D1: an average internal diameter at a base of the fluidisation zone of the enclosure designed for future production,
  $\Phi v$: a nominal fluidisation air flow rate in kg/h, and
  A: the thickness of the insert added at a periphery of the fluidisation zone to reduce the internal diameter of the fluidisation zone between 0.15 m and 0.7 m.

12. The furnace according to claim 9, wherein the furnace is an existing furnace and the insert is inserted in the furnace after construction of the furnace.

13. The furnace according to claim 9, wherein the insert is provided during the construction of the furnace.

14. The furnace according to claim 9, wherein the insert comprises a wall inserted against the portion of the enclosure delimiting the fluidisation zone, and wherein the wall is made of refractory materials.

15. The furnace according to claim 14, wherein the refractory materials are bricks of refractory material, or concrete.

16. The furnace according to claim 9, wherein the insert can be dismantled.

17. The furnace according to claim 9, wherein the insert extends beyond the fluidisation zone over an entire height of the furnace.

18. The furnace according to claim 9, wherein the insert extends along walls of the enclosure delimiting the fluidisation zone and rests against a periphery of the fluidisation dome, and wherein a diameter of fluidisation zone is reduced by an amount equal to two times a thickness of the insert.

* * * * *